United States Patent
Singh et al.

(10) Patent No.: US 8,301,771 B2
(45) Date of Patent: Oct. 30, 2012

(54) METHODS, SYSTEMS, AND COMPUTER PROGRAM PRODUCTS FOR TRANSMISSION CONTROL OF SENSITIVE APPLICATION-LAYER DATA

(75) Inventors: Mona Singh, Cary, NC (US); Jeffrey Scott Bardsley, Durham, NC (US); Richard Mark Horner, Cary, NC (US)

(73) Assignee: Armstrong, Quinton Co. LLC, Wilmington, DE (US)

( * ) Notice: Subject to any disclaimer, the term of this patent is extended or adjusted under 35 U.S.C. 154(b) by 1801 days.

(21) Appl. No.: 11/259,728

(22) Filed: Oct. 26, 2005

(65) Prior Publication Data

US 2007/0094394 A1    Apr. 26, 2007

(51) Int. Cl.
 *G06F 15/173* (2006.01)
(52) U.S. Cl. ........ 709/226; 709/227; 709/234; 709/235; 386/246; 726/25; 726/30; 726/11; 726/12; 726/13; 726/18; 370/351; 370/349
(58) Field of Classification Search ................ 709/226, 709/227, 234, 235; 386/246; 726/25, 18, 726/30, 11, 12, 13; 370/351, 349
See application file for complete search history.

(56) References Cited

U.S. PATENT DOCUMENTS

| | | | |
|---|---|---|---|
| 5,086,469 A | | 2/1992 | Gupta et al. |
| 5,473,691 A | | 12/1995 | Menezes et al. |
| 5,594,869 A | | 1/1997 | Hawe et al. |
| 5,657,390 A | | 8/1997 | Elgamal et al. |
| 6,055,599 A | * | 4/2000 | Han et al. ................ 710/317 |
| 6,754,819 B1 | | 6/2004 | Wootten et al. |
| 6,775,769 B1 | | 8/2004 | Inada et al. |
| 6,918,034 B1 | | 7/2005 | Sengodan et al. |
| 7,286,552 B1 | * | 10/2007 | Gupta et al. ................ 370/413 |
| 7,327,762 B2 | * | 2/2008 | Lee ................ 370/474 |
| 7,403,543 B2 | * | 7/2008 | Lee et al. ................ 370/477 |
| 2002/0059369 A1 | * | 5/2002 | Kern et al. ................ 709/203 |
| 2002/0085591 A1 | * | 7/2002 | Mesh et al. ................ 370/535 |
| 2002/0169952 A1 | | 11/2002 | DiSanto et al. |
| 2003/0035441 A1 | * | 2/2003 | Cheng et al. ................ 370/474 |
| 2004/0139313 A1 | | 7/2004 | Buer et al. |
| 2005/0076197 A1 | | 4/2005 | Struik |
| 2005/0138350 A1 | | 6/2005 | Hariharan |
| 2005/0154882 A1 | | 7/2005 | Struik |
| 2005/0262557 A1 | * | 11/2005 | Fellenstein et al. ............ 726/22 |
| 2007/0234034 A1 | * | 10/2007 | Leone et al. ................ 713/150 |

(Continued)

OTHER PUBLICATIONS

"QoS Classification and Marking on Catalyst 6000 Family Switches Running in Cisco Integrated IOS (Native Mode)," Cisco Systems, Inc., pp. 1-14 (Mar. 24, 2005).

(Continued)

*Primary Examiner* — Lan-Dai T Truong
(74) *Attorney, Agent, or Firm* — Connolly Bove Lodge & Hutz LLP

(57) ABSTRACT

Disclosed are methods, systems, and computer program products for identifying sensitive application-layer data and controlling transmission of the data in a network. According to one method, sensitive data in a system resource is identified at an application layer. A packetization of the identified sensitive data is detected. A flag indicative of the presence of sensitive data is inserted in a packet having at least a portion of the identified sensitive data in response to identifying the sensitive data and detecting the packetization. The flag is inserted in a portion of the packet corresponding to a layer other than the application layer. Transmission of the packet is controlled in a network based on the flag.

31 Claims, 11 Drawing Sheets

U.S. PATENT DOCUMENTS

2008/0298244 A1* 12/2008 Corl et al. ............ 370/235
2009/0049296 A1* 2/2009 Kent et al. ............ 713/160

OTHER PUBLICATIONS

Hagen, "IPv6: Learn it, love it," SearchNetworking.com, pp. 1-6 (Dec. 19, 2002).

Ziegler et al., Linux Firewalls: Packet Filtering, Informit Network, pp. 1-7 (Mar. 29, 2002).

"Frame," http://www.webopedia.com/TERM/f/frame.html, Webopedia Computer Dictionary, pp. 1-2 (Jan. 28, 2002).

Tyson, "How Firewalls Work," http://computer.howstuffworks.com/firewall.htm, pp. 1-2 (Copyright 1998-2005).

Franklin, "How Routers Work," http://www.howstuffworks.com/router1.htm, pp. 1-2 (Copyright 1998-2005).

"The 7 Layers of the OSI Model," http://www.webopedia.com/quick_ref/OSI_Layers.asp, pp. 1-4 (Copyright 2004).

"The TCP/IP Guide—IP Datagram General Format," http://www.tcpiguide.com/free/t_IPDatagramGeneralFormat.htm, pp. 1-5 (Copyright 2001-2004).

"The TCP/IP Guide—IP Datagram Options and Option Format," http://www.tcpiguide.com/free/t_IPDatagramOptionsandOptionFormat.htm, pp. 1-3 (Copyright 2001-2004).

"TCP Header Format," http://www.freesoft.org/CIE/Course/Section4/8.htm, pp. 1-4 (Publication Date Unknown).

* cited by examiner

METHODS, SYSTEMS, AND COMPUTER PROGRAM PRODUCTS FOR TRANSMISSION CONTROL OF SENSITIVE APPLICATION-LAYER DATA

TECHNICAL FIELD

The subject matter described herein relates to application-layer data transmission security. More particularly, the subject matter described herein relates to methods, systems, and computer program products for identification of and transmission control for sensitive application-layer data.

BACKGROUND

Computer applications have advanced such that now a user can perform many functions from a single computer user interface. For example, among other uses for computers and computer interfaces, applications have been developed that can allow a user to create files, manage data, email others, and chat in real-time with friends and colleagues. Networking enables computers to communicate. Through networks of computers, users can communicate. This provides a rich environment for enhancing the lives of computer users.

This environment also allows for a more-efficient work force. Companies can network computers to allow higher employee productivity and more rapid information access. Companies can also connect their internal networks to the internet and other networks to allow for broader communication opportunities. By interconnecting computers, computer users can rapidly share data. This rapid data sharing can allow employees to make decisions more rapidly, thereby becoming more productive for the company. Companies are typically highly motivated to network computers in an effort to optimize productivity.

Companies can also partition their internal networks to allow for more efficient routing of communications between certain groups of employees or users. For example, a company may decide that financial users communicate more with one another than with outside vendors or company sales people. In a case such as this, a company can partition its internal network to allow local routing of information within a group. Routers can be employed in the networking infrastructure. Routers can determine whether an external route (outside of a sub-domain or network) is needed or whether internal routing can be done for each message or packet transmitted to one of its interfaces. For any information that needs to go outside of a group, a router can find a path by which to route the information among the many external paths it is associated with. Partitioning by the use of routers can simplify router design and routing algorithms, which can thereby reduce the cost of routers.

When interfacing to external networks, companies typically employ firewall technology. Firewalls can be used to limit external access to internal company computers and network components. By employing firewall technology, companies can attempt to prevent hacker access to their internal computers. Firewalls can also be used to limit spam email and a variety of other related functions.

However, with its focus on prevention of external attacks and accesses, existing technology actually allows the inadvertent (or intentional) transmission of sensitive data by employees or users to other computer users outside the firewall. Firewalls are designed to prevent attackers and spammers from getting in, not to prevent employees and users from sending sensitive information out. Likewise, routers are designed to route rather than to prevent transmission. While certain router sub-domains can be defined within a network to allow for more efficient routing when computers on the same sub-domain wish to communicate, routing outside a sub-domain can also be done.

Therefore, there exists a need to be able to identify sensitive data at an application layer, to associate this sensitive data with transmission control rules and policies, and to enforce these rules and policies to control transmission of the sensitive data by other layers of a system.

Accordingly, in light of difficulties associated with conventional data security systems that do not address these needs, there exists a need for improved methods, systems, and computer program products for providing identification of and transmission screening and control for sensitive application-layer data.

SUMMARY

According to one aspect, the subject matter described herein comprises methods, systems, and computer program products for identifying sensitive application-layer data and controlling transmission of the data in a network. One method includes identifying, in a system resource, sensitive data at an application layer, detecting a packetization of the identified sensitive data, in response to identifying the sensitive data and detecting the packetization, inserting a flag indicative of the presence of sensitive data in a packet having at least a portion of the identified sensitive data, wherein the flag is inserted in a portion of the packet corresponding to a layer other than the application layer, and controlling transmission of the packet in a network based on the flag.

The subject matter described herein for identifying sensitive application-layer data and controlling transmission of the data in a network may be implemented using a computer program product comprising computer executable instructions embodied in a computer readable medium. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Due to the existing need to be able to identify sensitive data at an application layer and to control transmission of this sensitive data by other layers in a system, including controlling egress of packetized data at a network infrastructure device in a network, the present disclosure describes methods, systems and computer program products to solve these problems. By associating sensitive data with transmission control rules and policies and by enforcing these rules and policies to control transmission of the sensitive data by other layers of a system, the disclosure herein can be used to enhance network security.

Figure 1:
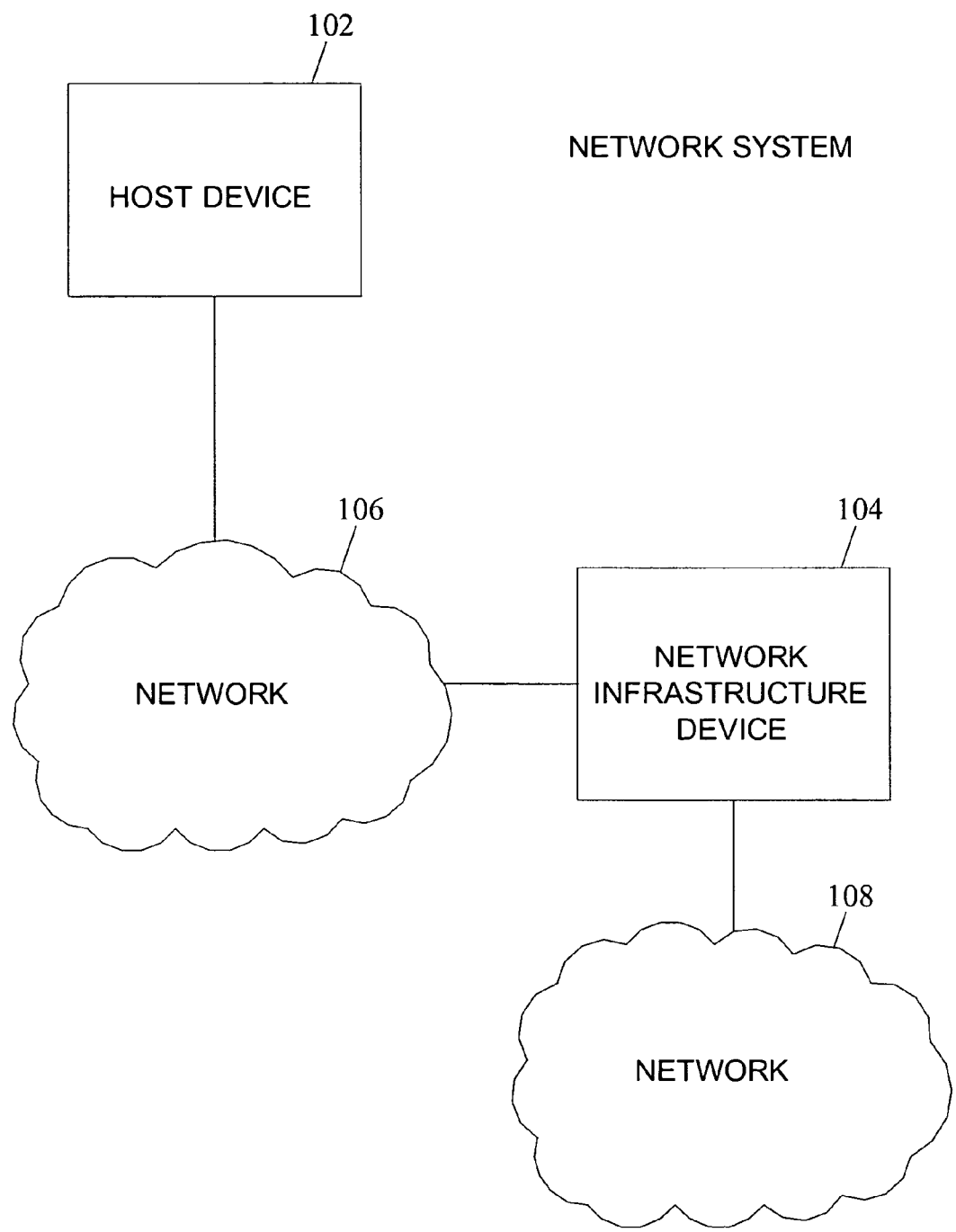
FIG. 1 is a block diagram of an exemplary network according to an embodiment of the subject matter described herein.

FIG. 1 illustrates an exemplary network system 100. Within network system 100 are host device 102 and network infrastructure device 104. Host device 102 and network infrastructure device 104 are connected to each other through network 106. Network infrastructure device 104 is also shown connected to a separate network 108 to allow infrastructure device 104 to communicate with other devices (not shown in FIG. 1) within network system 100.

Host device 102 can be any device capable of accepting user input, processing user commands, and communicating over a network. For example, host device 102 can be a computer, personal digital assistant (PDA), or any other device with which a user can enter information, store information, and access a network.

Network infrastructure device 104 can be any network interface device capable of connecting two or more networks. For example, network infrastructure device 104 can be a gateway, a switch, a firewall, a router, a bridge, or any other network interface device capable of connecting to a network. Network infrastructure device 104 may also be a single-network interface device, such as a server, that uses a single network interface to communicate with external devices. In another example, network infrastructure device 104 may be a network interface card (NIC) for a host device such as host device 102, or any other device capable of communication across a network such as network 106 and network 108.

Both network 106 and network 108 can be any network a user can connect to through a device such as host device 102 and communicate with other users in other networks. For example, either network can be a local area network (LAN), a sub-network within a LAN, a wide area network (WAN), and any other network system capable of allowing a user to communicate with other data users. For example, either or both networks can include wireless communication medium capable components, wire-based communication medium capable components, optical-based communication medium capable components, or any combination thereof. Network 108 can also be the same network as network 104.

To facilitate ease of discussion, a system resource, as used herein, shall include any stored information, file, data being typed by a user in an email or chat session, or any other embodiment of data that can be created or analyzed with a host device such as host device 102. A system resource can further include any packetized representation of any such information.

A user of host device 102 may typically perform a variety of operations with host device 102, each of which shall be considered to create a system resource that can be operated upon. For example, host device 102 can provide an email application for the user, a chat session application for the user, as well as basic file creation and management interfaces and applications. With this flexibility comes a danger of information distribution by a user, whether intentional or inadvertent, from host device 102. Unfettered data access and transmission by a user could potentially compromise sensitive data that resides on host device 102 or that is resident on a device connected to a network accessible by host device 102. For example, email and email attachments, chat sessions, and a variety of other applications are becoming so commonly used that a user could provide sensitive information to an unintended or disallowed recipient rather easily. A user, or an employer of a user, may wish to limit sensitive or confidential information from being transmitted by a user. In order to reduce this potential for sensitive data distribution and to achieve control over transmission and distribution of sensitive or confidential information, host device 102 and network infrastructure device 106 can be used as described herein.

Figure 2:
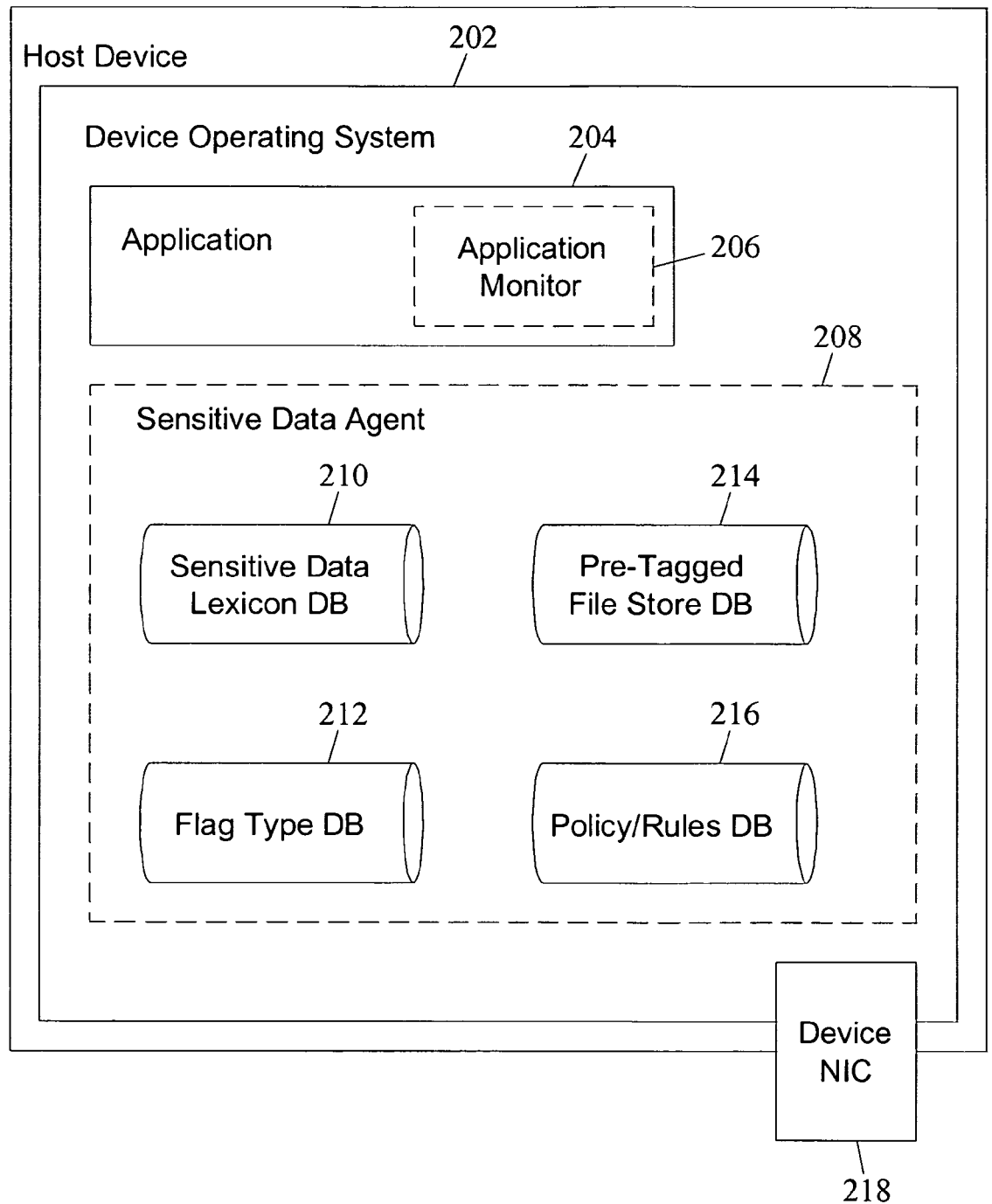
FIG. 2 is a block diagram with an exemplary host device according to an embodiment of the subject matter described herein.

FIG. 2 shows an exemplary host device 200 according to one embodiment of the disclosure herein. Host device 200 can have a device operating system 202. Host device 200 can have one or more applications, such as application 204, associated with device operating system 202. Each application 204 can operate in conjunction with device operating system 202, can be part of device operating system 202, or can operate independently in effect as its own operating system. Each application 204 can be configured to include an application monitor 206. Application monitor 206 can be adapted to interpret user input within an application 204, as will be discussed below.

Host device 200 can also include a sensitive data agent 208, which can operate in conjunction with device operating system 202 and/or application 204, can be part of device operating system 202 and/or application 204, or can operate independently. Sensitive data agent 208 can work in conjunction with application monitor 206 to coordinate sensitive data identification and recognition. Sensitive data agent 208 can further detect sensitive data packetization, create sensitive data flags, insert sensitive data flags into packets that carry all or a portion of identified sensitive data, tag files that contain sensitive data, and create and distribute policy and rules to control sensitive data transmission. The terms packetize or packetization, as used herein, is any process by which data is placed into packets, or any transport unit, with the initial intention of transmitting the packet over a communication network. The term flag, as used herein, is any indicator that can provide an indication within a packet as described herein or as would otherwise be known to one having ordinary skill in this art. A flag is not intended to be limited to a specific length or size or other characteristic. A flag is also not intended to be required to be dedicated to performing only the specific indication-providing purpose described herein, but may also serve other purposes in connection with the respective packet.

Sensitive data agent 208 can include a sensitive data lexicon database 210. Sensitive data lexicon database 210 can store representations of sensitive data (sensitive data lexicons) for use by application monitor 206. Application monitor 206 can both create new sensitive data lexicons to store within sensitive data lexicon database 210 and can monitor user input in its associated application 204 by communicating sensitive data lexicon information with sensitive data agent 208. A sensitive data lexicon can include, for example, specific words, numbers or alphanumeric sequence patterns, names of persons, dates of birth, credit card numbers, social security numbers, addresses, and any other information that a user of host device 102 may create or have access to and that may be classified as sensitive data. The sensitive data lexicons in sensitive data lexicon database 210 can be preconfigured, dynamically configurable, and/or can vary based on context, such as the particular application 204, the intended data recipient, the user, and other contexts based upon previously defined policies and rules.

As a user interfaces with an application 204, application monitor 206 can be invoked to interpret user input. An initial user may wish to create a sensitive data lexicon for placement in sensitive data lexicon database 210. Application monitor 206 can be adapted to interpret an indication from a user to create a sensitive data lexicon and store the newly created sensitive data lexicon in the sensitive data lexicon database 210. During this process of creating sensitive data lexicons, application monitor 206 can communicate with sensitive data agent 208 to create a new sensitive data lexicon which can be stored in sensitive data lexicon database 210. A flag can also be created along with the new sensitive data lexicon for use during transmission events where an associated sensitive data transmission is attempted. This flag can be placed in flag type database 212 and stored in a manner similar to the storage of sensitive data lexicons. Each flag can be associated with one or more sensitive data lexicons. In one implementation, flag type database 212 and sensitive data lexicon database 210 are combined into a common database. Flags contained within flag type database 212 can be inserted into packets carrying sensitive data to other devices within the network to allow for the detection of the presence of sensitive data within the packet.

Application monitor 206 can also provide a recognition function by comparing user input to entries in sensitive data lexicon database 210. This recognition by comparison can be performed either in real time when a user is entering data or when a file is saved depending upon the desired mode of operation. When a user of an application 204 inputs or accesses any sensitive data lexicon that is already stored in sensitive data lexicon database 210, application monitor 206 can identify a match with a stored sensitive data lexicon. When a match is identified, a flag that is associated with the sensitive data lexicon and stored in flag type database 212 can then be associated with the user input.

In the case of a user that is creating a file to be stored, a file tag can be created and associated with the file and stored in pre-tagged file store database 214. This file tag can be referenced whenever a file that contains the associated sensitive data is packetized. For example, a file may be packetized when a user attempts to transmit the file, such as when a user attempts to email a tagged file that contains sensitive data, attempts to access a file transfer protocol (FTP) site with a "PUT" command for a tagged file, attempts a telnet file transmission, or attempts any other transmission. In such cases, transmission control procedures as described herein can be employed to control the transmission of the file containing sensitive data.

In the case of a chat session or any other real-time communication, application monitor 206 can also monitor user input in application 204 in real time and compare this input to sensitive data lexicons stored in the sensitive data lexicon database 210 to determine whether transmission control procedures may be needed.

In either the case of a file transmission or a chat/email session (or any similar session), the user can be notified that sensitive data has been detected and can be instructed as to the actions taken or any options the user may have with respect to the attempted sensitive data transmission. The actions taken can be based upon previously defined policies and rules, and the user or the user's employer can be provided with the appropriate flags and policies/rules.

During the sensitive data lexicon and flag type creation process, a user or a system administrator can also create policies and rules to be enforced for transmission control of sensitive data. These policies and rules can be stored in policies/rules database 216. Transmission control policies and rules can be created to limit transmission of sensitive data so that it can only be transmitted within a given subnet of a LAN, within a specific LAN, or any other transmission limitation that may be desired. For example, a business entity may wish to limit transmission of financial data so that it can be freely transmitted within a financial sub-LAN, but may want to prevent transmission of sensitive financial data to other departments within the company. In this situation, a rule or policy can be created for any sensitive financial data that can flag the sensitive data and limit its transmission, as will be discussed below, so that it cannot be inadvertently transmitted outside the financial LAN.

As another example, a user at a business entity could initiate a chat session with a friend that works for another company. While chatting with his friend, the user can receive a chat Invite from a co-worker who needs information about a current project. The user can be allowed to transmit sensitive information to his co-worker, but the business entity may wish to prevent transmission of sensitive information to anyone outside the company. A situation can be envisioned whereby the user attempts to respond to his co-worker with sensitive information and inadvertently (or intentionally) types sensitive information into the chat session window associated with his friend at another company. In this situation, application monitor 206 can monitor the user input, compare it to sensitive data lexicons in the sensitive data lexicon database 210, and can tag the sensitive data for transmission control.

As will be discussed in more detail below, in either situation, upon receiving a packet containing sensitive data, a network infrastructure device such as network infrastructure device 104 of FIG. 1 can identify the presence of flags, inserted in the packet by a host device, which indicate that the packet contains sensitive data. A network infrastructure device such as network infrastructure device 104 can then apply rules and policies that have been previously defined for this sensitive data. These rules and policies may indicate that this sensitive data should not be transmitted outside of the company. Upon determining that this sensitive data should not be transmitted outside of the company, a network infrastructure device, such as network infrastructure device 104, can prevent the transmission of the company's sensitive information to the user's friend. It can also notify the user or employer of the attempted transmission, along with a variety of other transmission control possibilities. Those skilled in the art will recognize many approaches to notification and attempted control handling. All are considered within the scope and spirit of the present disclosure.

Network infrastructure device 104 is shown in FIG. 1 as an external entity distributed within a network. Similar embodiments will also be discussed in FIGS. 3 and 5 below. For a better understanding of the flexibility of the present approach, it should be noted that device Network Interface Card (NIC) 218 can also provide a platform upon which an embodiment similar to network infrastructure device 104 can reside. Accordingly, any discussion contained herein regarding the enforcement of rules and policies can be considered to include embodiments where the network infrastructure device is a part of the host device or where the device is external to the host and distributed throughout the network. Further, multiple network infrastructure devices can work in conjunction with one another to form a distributed enforcement capability, as will be discussed in more detail below.

It should likewise be noted that, while sensitive data lexicon database 210, flag type database 212, and policy/rules database 216 are shown as separate entities within sensitive data agent 208, they could be combined into a single database without departing from the spirit and scope of the present disclosure. Additionally, any new information created and stored in flag type database 212 and policy/rules database 216 can be distributed to other entities across the network as will be described below. In this way, devices such as network infrastructure database 104 of FIG. 1 can be informed of the flag types to track or monitor, and the associated policy and rules to be enforced. The sensitive data lexicon entries stored in sensitive data lexicon database 210 can also be distributed to other entities within the system without departure from the scope and spirit of the present disclosure.

When a transmission is attempted and the sensitive data is packetized, sensitive data agent 208 can insert flags from flag type database 212 into packets that carry any portion of the sensitive data. As discussed above, this can be any attempted real-time transmission, such as with a chat session or email message, or any attempted file transmission. By placing a flag in packets that contain any portion of the sensitive data packet, transmission of packets that contain sensitive data can be controlled on a packet-by-packet basis. Note that multiple flags could be associated with a given packet without departing from the scope and spirit of this disclosure. Details of potential placement options for flags within existing protocol header and frame definitions will be discussed below following discussion of the remaining diagrams related to this embodiment.

Figure 3:
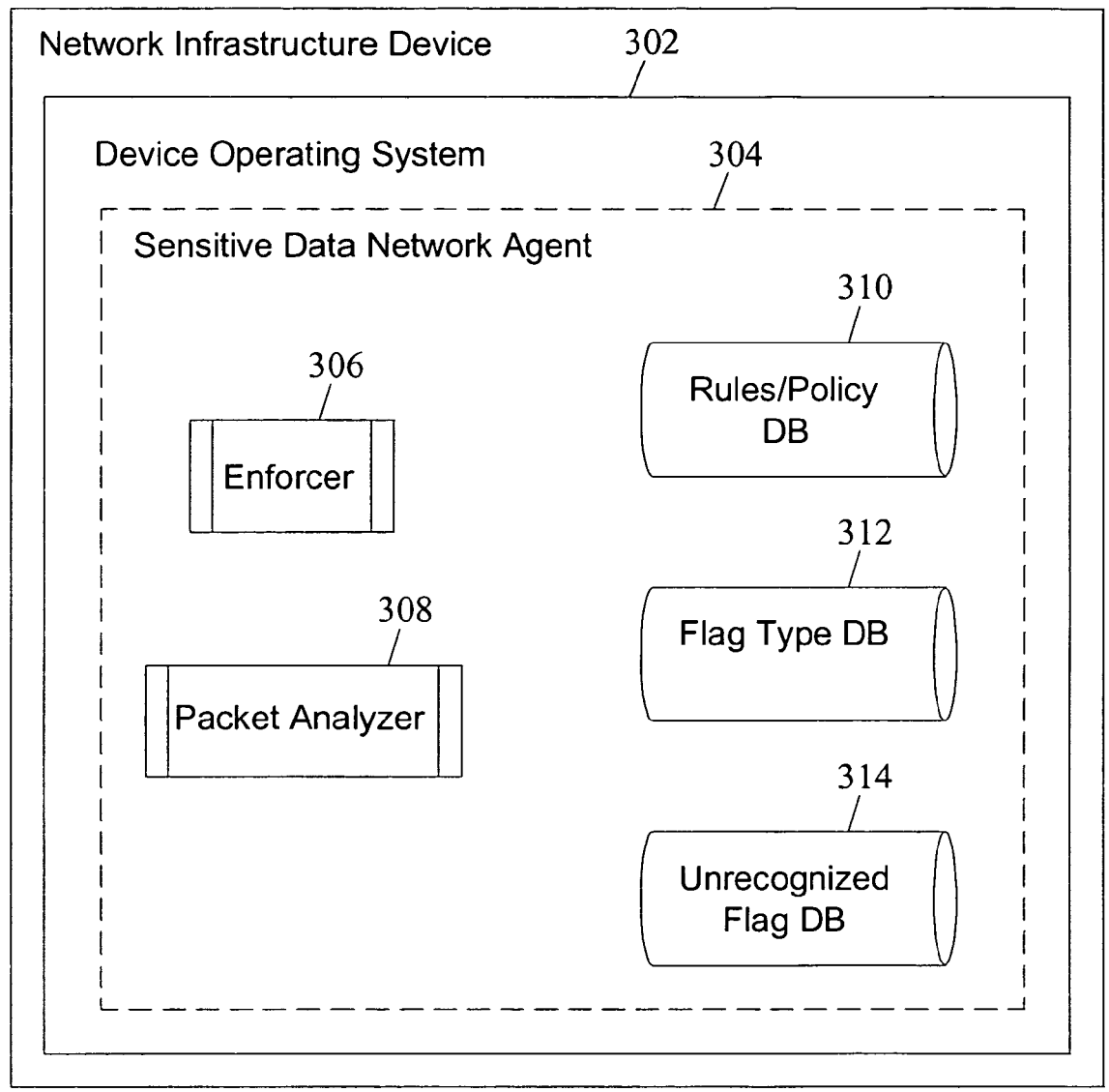
FIG. 3 is a block diagram of an exemplary network infrastructure device according to an embodiment of the subject matter described herein.

Turning now to FIG. 3, an exemplary network infrastructure device 300 is shown. A device operating system 302 is shown operatively associated with a sensitive data network agent 304. Enforcer entity 306 and a packet analyzer entity 308 are also shown. Rules/policy database 310 and flag type database 312 resemble rules/policy database 216 and flag type database 212 of FIG. 2, respectively.

When sensitive data agent 208 of FIG. 2 creates new flag types and rules/policies, it also sends the new flag types and rules/policies to its associated network infrastructure device. Rules/policy database 310 and flag type database 312 may be updated to include the latest set of rules/policies and flags, respectively.

During transmission packet processing, there may occasionally be data in one of the previously discussed locations for flag implementation. In this case, the flag may not be recognized or the data may inadvertently be a flag while not meant to be one. For the case of an inadvertent flag, normal flag interpretation procedures should be employed with appropriate tracking methods to determine whether the flag definitions need to be changed. Discussion of this possibility is not essential for an understanding of the present disclosure, and as such, it will not be described in detail.

For the case of unrecognized data in a flag field, a log of the unrecognized data can be maintained. Unrecognized flag database 314 can be provided for storage of any data detected in a flag field of any incoming packet that does not already exist in the local flag type database 312. In this way, other uses of the various existing protocol header and frame fields that can be used for sensitive data flags, to be discussed in more detail below, should not be interfered with, but can instead be recorded for ongoing sensitive data transmission control analysis and improvement. Details of these actions will not be discussed herein to simplify the present discussion.

When a data packet is received at network infrastructure device 300, sensitive data network agent 304 is invoked. Enforcer entity 306 can communicate with packet analyzer 308. Packet analyzer 308 can interpret the incoming packet stream and parse packet headers for sensitive data flags. When a sensitive data flag is found in a packet header, enforcer entity 306 can be notified to act upon the received packet. Enforcer entity 306 can then query flag type database 312 and rules/policy database 310 to verify that the flag type is a valid sensitive data flag and to determine the proper rules and policy associated with a packet that has such a sensitive data flag in its header.

Enforcer entity 306 can then execute any commands necessary to carry out the actions defined by the policy and rules for each such flag found in such a header. It should be noted that multiple flags can exist within any given header due to a variety of circumstances without departing from the scope and spirit of the present disclosure. For example, where a packet contains both a text sensitive data lexicon and a portion of a file has been tagged as containing sensitive data, multiple flags can exist for the packet. In such a case, more stringent rules and policies can be employed to attempt to protect the more sensitive data.

As described above, in the event that enforcer entity 306 does not find the received flag or flags in flag type database 312, it can make an entry in unrecognized flag database 314. This can allow tracking and improvements of sensitive data transmission control, as discussed above.

Any actions taken by enforcer entity 306 can be either logged locally or transmitted back to sensitive data agent 208 as exemplified in FIG. 2. In the event the actions are communicated to sensitive data agent 208, sensitive data agent 208 can communicate them to application monitor 206. Application monitor 206 can thereby notify the user that the input or transmission was acted upon and it can detail what actions were taken. Available actions include forwarding the packet only to those that the destinations authorized to receive the packet and not forwarding the packet to any destination that is not so authorized. As well, the packet can be destroyed. One skilled in the art may recognize many other possible methods for handling a sensitive data transmission control event. All are considered within the scope and spirit of the present disclosure.

By communicating sensitive data control event information, sensitive data network agent 304 and sensitive data agent 208 work in conjunction with application monitor 206 to create and maintain sensitive data lexicons, control transmission of sensitive data in packets, and report these control actions to a user or employer.

Figure 4:
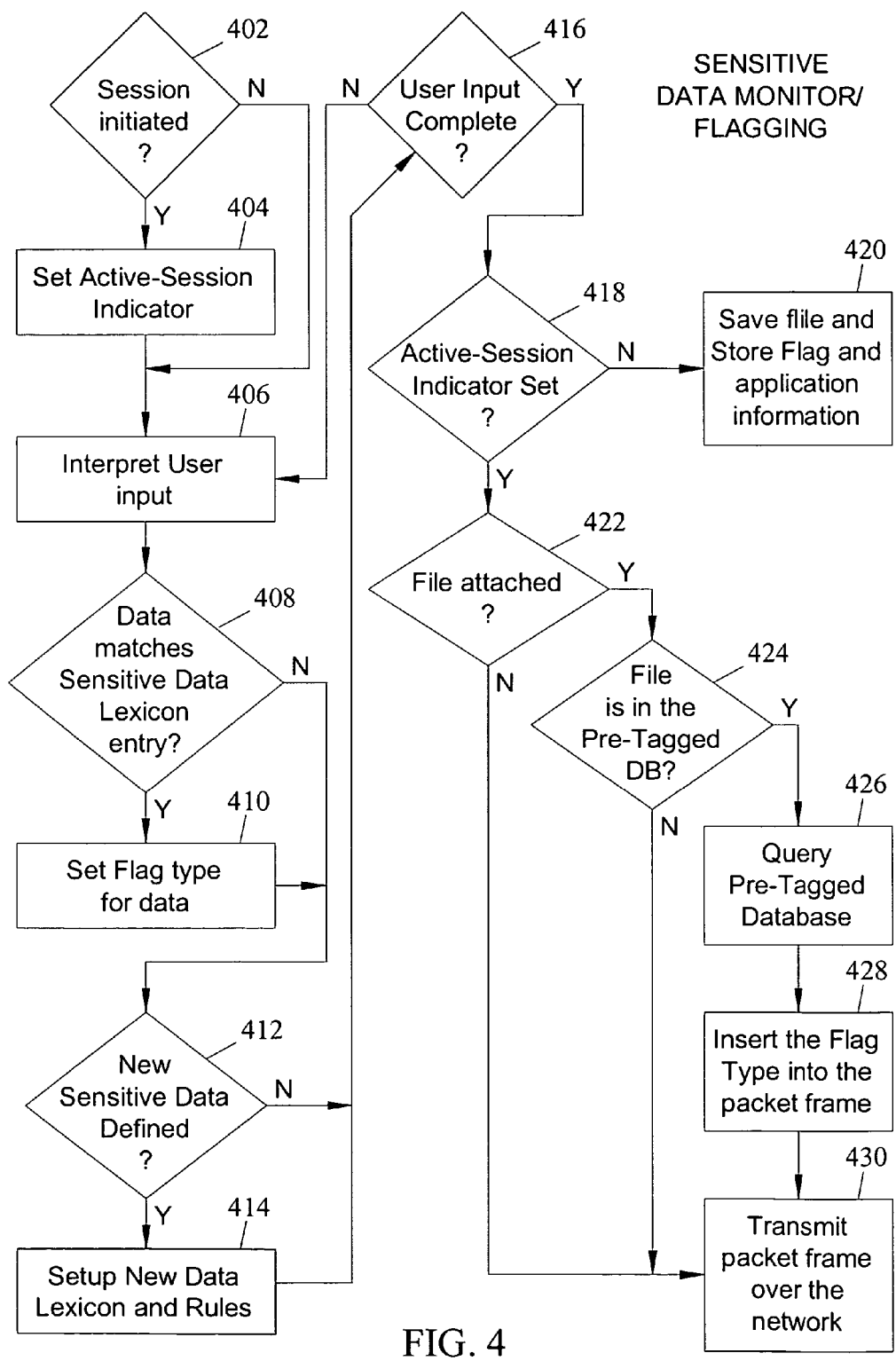
FIG. 4 is a flow chart of a sensitive data monitor/flagging process according to an embodiment of the subject matter described herein.

FIG. 4 shows an exemplary sensitive data monitor/flagging process 400. At decision point 402, a determination can be made as to whether the user has initiated some type of network session or whether the user attempting to create a file. As discussed above, a session can include a chat session, an email session, or any other type of communication session other than a file creation type activity. If, at decision point 402, a determination is made that a session has been initiated, a transition can be made to block 404 to set an active-session indicator and a transition can be made to block 406 to interpret user input. If a determination is made at decision point 402 that a session has not been initiated, a transition can be made to block 406, thereby bypassing the active-session indicator block 404.

After setting the active-session indicator or refraining from doing so, control proceeds to decision point 408 where user input can be compared to all of the existing sensitive data lexicons to determine whether there is a match. If there is a match, the flag type for the data can be set at block 410 and a transition to decision point 412 can be made. If there is not a match at decision point 408, a flag may not be required for the user input. In this case, a transition can be made to decision point 412 without a transition through block 410. At decision point 412, a determination can be made as to whether the user is attempting to define a new sensitive data lexicon. If the user is attempting to define a new sensitive data lexicon, a transition can be made to block 414 to set up a new data lexicon and associated rules in the sensitive data lexicon and policy/rules databases, respectively.

If there is no new sensitive data lexicon to be defined at decision point 412 or when the setup is complete at block 414, a transition can be made to decision point 416 to determine whether user input is complete. If it is determined that user input is not complete, a transition can be made back to block 406 to interpret new user input and the process just discussed can repeat until user input is complete. Once user input is complete, a transition can be made to decision point 418 where the active-session indicator can be checked to determine whether a session is active or whether a file needs to be stored. If a file needs to be stored, a transition can be made to block 420 where the file can be saved and the flag and associated file name can be stored in the pre-tagged file store database 214.

If, at decision point 418, a determination is made that a session is active, a transition can instead be made to decision point 422 to determine whether a file is attached to the attempted transmission. If a file is attached, a transition can be made to decision point 424 to determine whether the file is in the pre-tagged file store database 214. If the file is in the pre-tagged file store database 214, the pre-tagged file store database 214 can be queried at block 426 for the appropriate flag to be placed in any packet headers associated with the file, as discussed above. At block 428, the flag can be inserted into the packet frame or frame header and at block 430 any packets associated with the file can be transmitted over the network. It should be noted that in a situation where the transmission control enforcing device is co-located with the monitoring device (e.g., in the case that the host NIC card can enforce the rules/policies) then block 430 can be any internal operation capable of forming a packet for transmission and forwarding it to the device NIC card. If a determination is made at decision point 422 that there is no file attached or at decision point 424 that the file is not in the pre-tagged file store database 214, the packet can be transmitted over the network at block 430 as discussed above.

Figure 5:
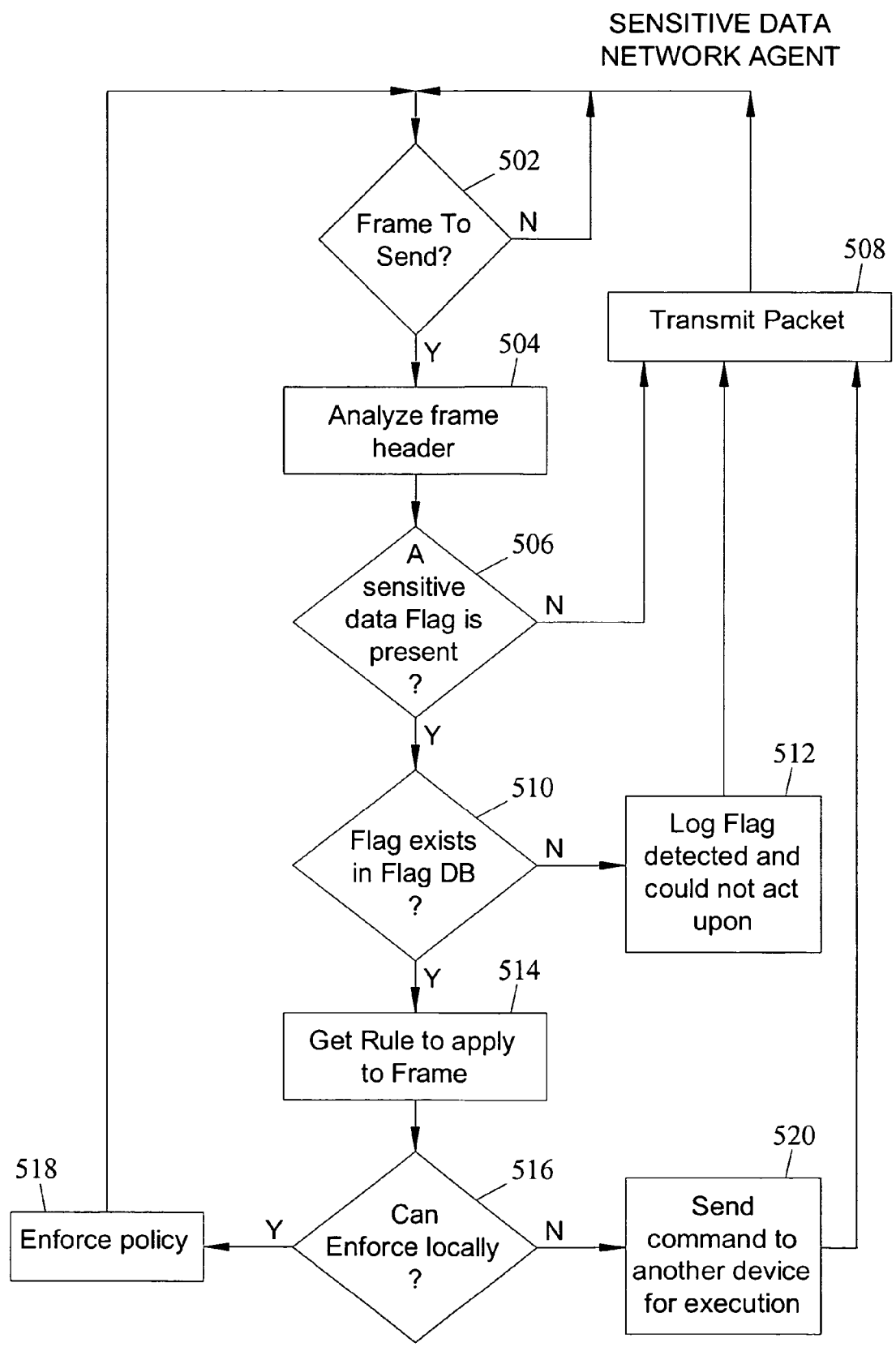
FIG. 5 is a flow chart of a sensitive data network agent process according to an embodiment of the subject matter described herein.

FIG. 5 shows a sensitive data network agent process 500 capable of interpreting flags in data packets and controlling transmission of the packets based upon rules and policies as discussed above. At decision point 502, sensitive data network agent process 500 can wait for a frame to send. When a frame arrives, the frame header can be analyzed at block 504. At decision point 506, a determination can be made as to whether a sensitive data flag is present. If there is no sensitive data flag present, the frame can be transmitted at block 508 without further intervention from sensitive data network agent process 500 and a transition can be made back to decision point 502 to await a new frame.

It should be noted that in other embodiments a location within the frame itself could be chosen as a flag location, as discussed in more detail below, and could be analyzed for flag information without departing from the scope and spirit of the present discussion. Accordingly, any reference to a frame header can include other locations within a packet frame, such as within the frame body itself or within other data fields of the packet.

When a sensitive data flag is present within a frame header, a determination can be made at decision point 510 as to whether the flag exists in the flag type database. If the flag does not exist in the flag type database, a log entry can be entered into an unrecognized flag database, as discussed above, indicating that data in a flag field was detected and could not be acted upon at block 512, the packet can be transmitted at block 508, and a transition can be made back to decision point 502 to await new packets.

As discussed above, many error handling procedures can be employed to handle a situation where a flag does not exist in the flag type database. Accordingly, all are considered within the scope and spirit of the present disclosure.

When a flag detected in a packet header is present in the flag type database, the corresponding policy or rule can be retrieved from the policy/rules database at block 514. At decision point 516, a determination can be made as to whether the policy or rule can be locally enforced. If the policy or rule can be enforced locally, this can be done at block 518, in which case the packet may or may not be transmitted depending upon the particular rule or policy to be enforced. In either case, a transition can then be made back to decision point 502 to await the next frame. As discussed above, there are a variety of enforcement activities that can be envisioned. Any and all such enforcement policies are considered within the scope and spirit of the present disclosure.

In the event that the rule or policy cannot be enforced locally, sensitive data network agent process 500 can, at block 520, identify another network device within the network that may be able to enforce the policy or rule. This identification can be accomplished by a provisioning table lookup, a broadcast messaging mechanism, or any other method of identifying a unit capable of processing the rule or policy. Accordingly, any mechanism by which a process such as sensitive data network agent process 500 can identify other network devices and their performance capabilities is considered within the scope and spirit of the present disclosure.

A command can be sent to the other network device at block 520 to allow that device to enforce the desired policy or rule, the packet can be forwarded to the device at block 508, and a transition can be made back to decision point 502 to await the next frame. It should be noted that, rather than sending a separate command at block 520, sensitive data network agent process 500 could instead insert a new sensitive data flag within the packet header or frame, or modify the existing sensitive data flag to alert the other device that the packet is a forwarded packet. Sensitive data network agent process 500 can also perform the lookup-and-forward operation as described above without modifying the packet header or sending a separate command. The alternative of passing the packet with any of a modified or additional flag, or without a change in the flags within the header, allows the other device to handle the packet through a process similar to sensitive data network agent process 500 described above, without a need for a separate message interpretation interface and message handling mechanism.

As described above, existing protocol header fields and frame fields can be used for placement of sensitive data flags. To facilitate the placement of sensitive data flags within existing packet formats, the following examples should provide appropriate guidance. The remaining figures show potential locations for placement of sensitive data flags within existing protocol headers and frames. Use of these fields may not require modification of the exemplary protocols.

Figure 6:
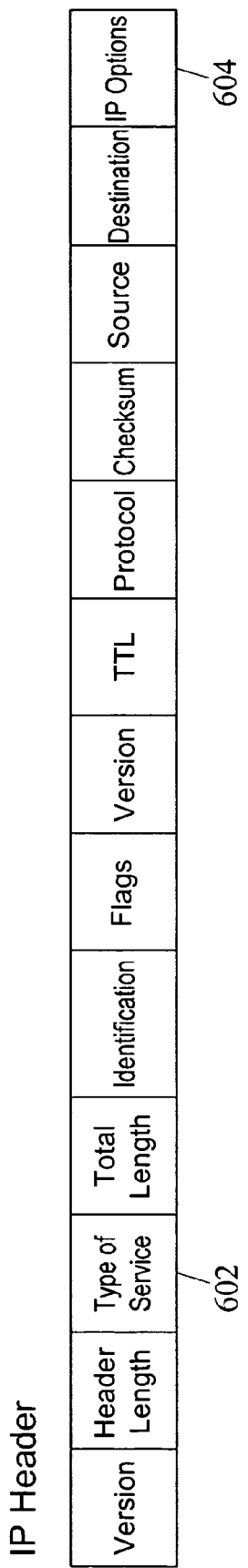
FIG. 6 is an exemplary Internet protocol (IP) header that can be used according to an embodiment of the subject matter described herein.

For example, FIG. 6 shows a representation of an exemplary Internet protocol (IP) header 600. Type-of-service field 602 and IP-options field 604 may both be used as a location for placement of sensitive data flags without modification to the protocol itself.

Figure 7:
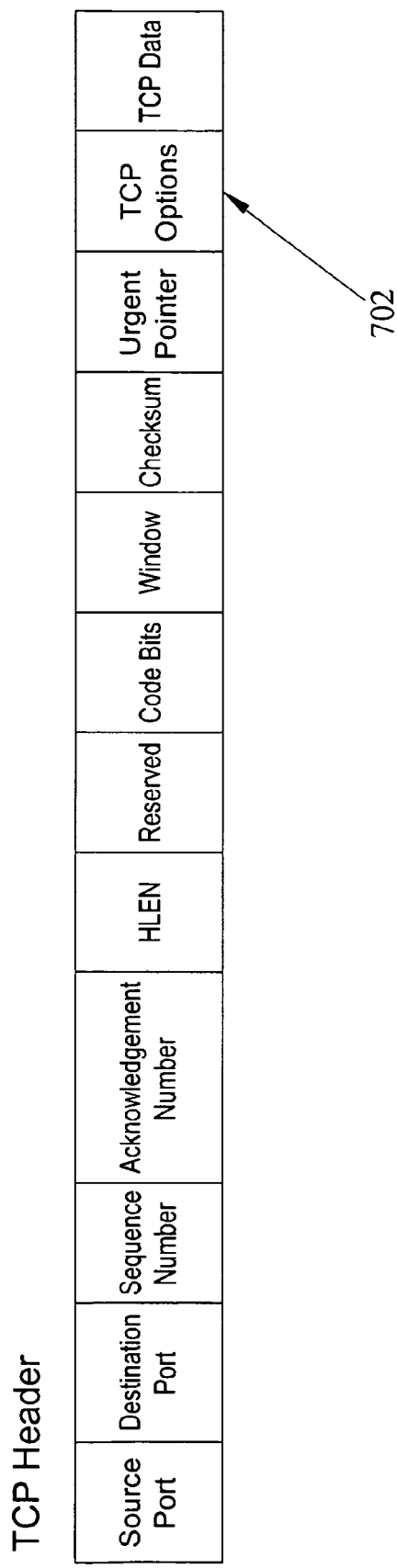
FIG. 7 is an exemplary transmission control protocol (TCP) header that can be used according to an embodiment of the subject matter described herein.

FIG. 7 shows a representation of an exemplary transmission control protocol (TCP) header 700. TCP-options field 702 may be used within TCP header 700 as a location for placement of sensitive data flags.

Figure 8:
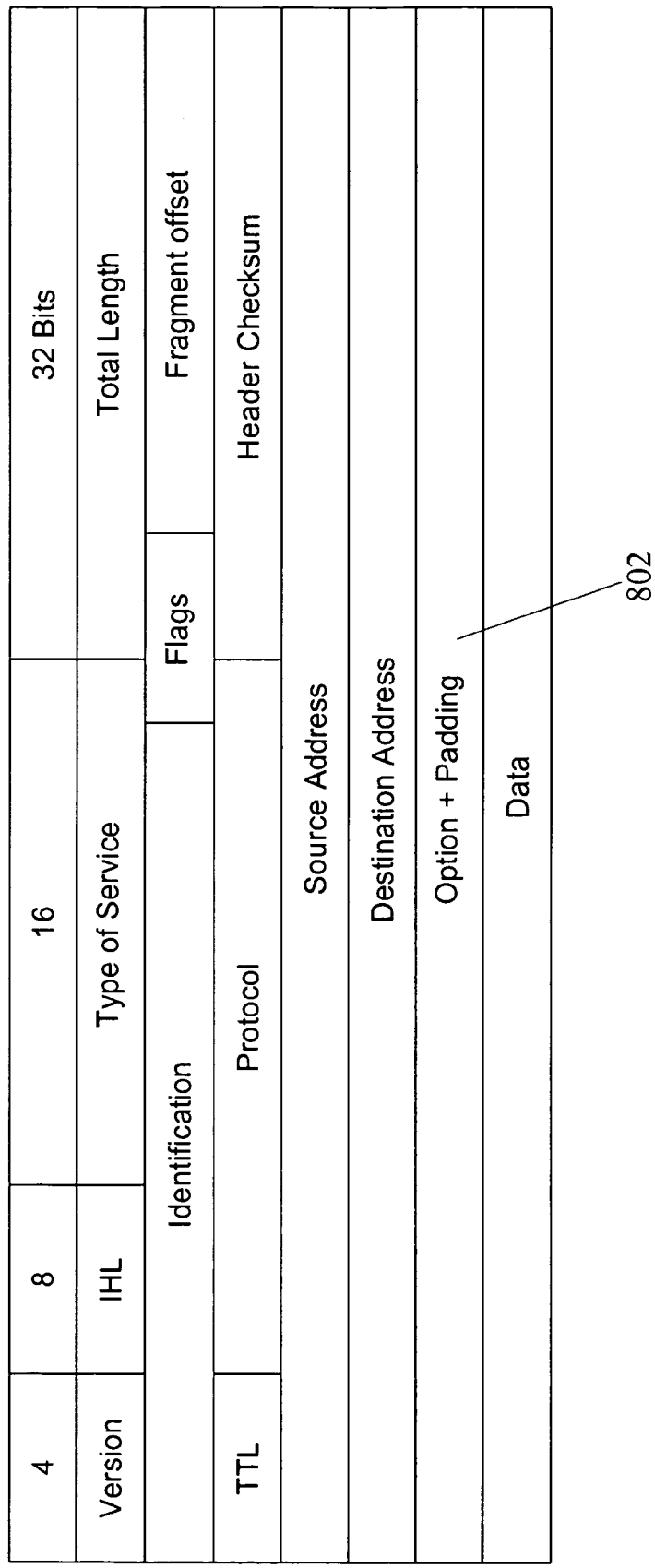
FIG. 8 is an exemplary Internet protocol version 4 (IPv4) frame that can be used according to an embodiment of the subject matter described herein.

FIG. 8 shows a representation of an exemplary IP version 4 (IPv4) Frame 800. The "option+padding" field 802 of IPv4 Frame 800 may be used as a location for placement of sensitive data flags.

Figure 9:
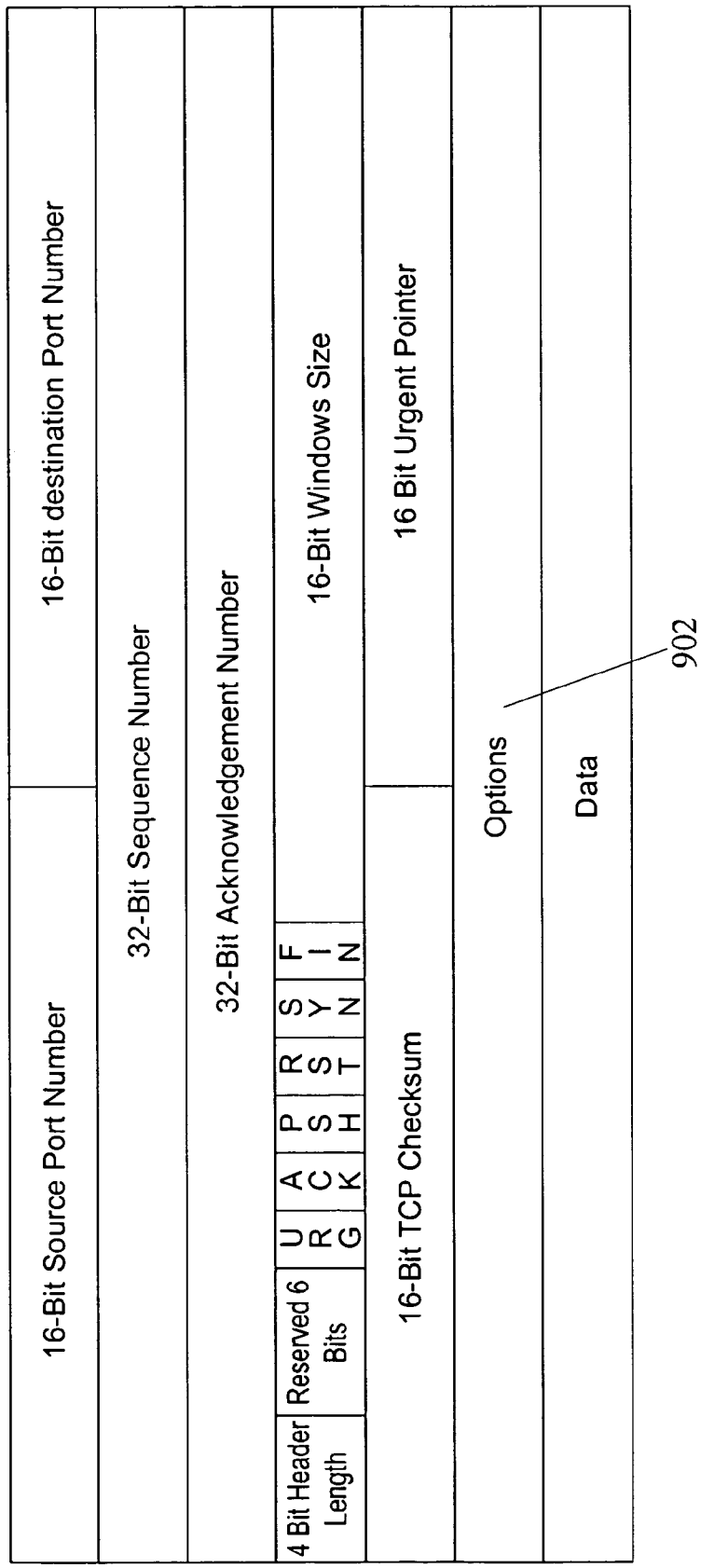
FIG. 9 is an exemplary transmission control protocol (TCP) frame that can be used according to an embodiment of the subject matter described herein.

FIG. 9 shows a representation of an exemplary TCP Frame 900. The options field 902 of TCP Frame 900 may be used as a location for placement of sensitive data flags. For the case of a TCP-options field being used to carry sensitive data flags, there are two options for the format of that option field. The first could be a single octet (8 bits) of option kind, and a second could be an octet of option kind followed by an octet of option length and then the actual option data octets.

Figure 10:
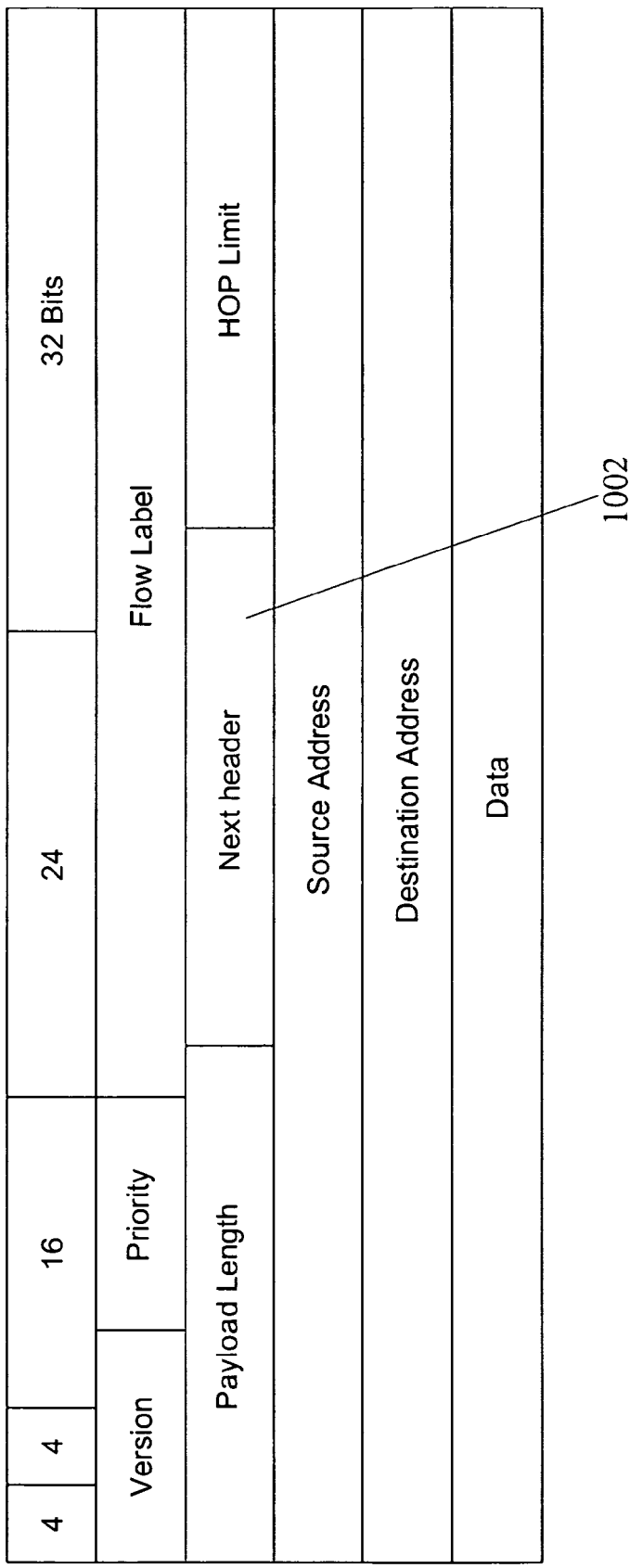
FIG. 10 is an exemplary Internet protocol version 6 (IPv6) frame that can be used according to an embodiment of the subject matter described herein.

FIG. 10 shows an example of an IP version 6 (IPv6) Datagram/Frame 1000. Next-header field 1002 may be used for insertion of information related to sensitive data flags. In IP version 6 (IPv6) datagrams/frames may allow for as many additional header fields as a user may desire. Because the extension headers are usually examined by a destination node only, they are well suited for deployment of sensitive data flags. An exception to this rule is the hop-by-hop options header which carries optional information that must be examined by every node along the path of the packet.

There are many possibilities for expanding these option-field uses for sensitive data flag usage, along with other potential deployments of the sensitive data flagging discussed above. All are considered within the scope and spirit of this disclosure. It should be viewed as sufficient that the sensitive data flags can be placed in existing fields within existing packet header formats without requiring protocol modifications.

Figure 11:
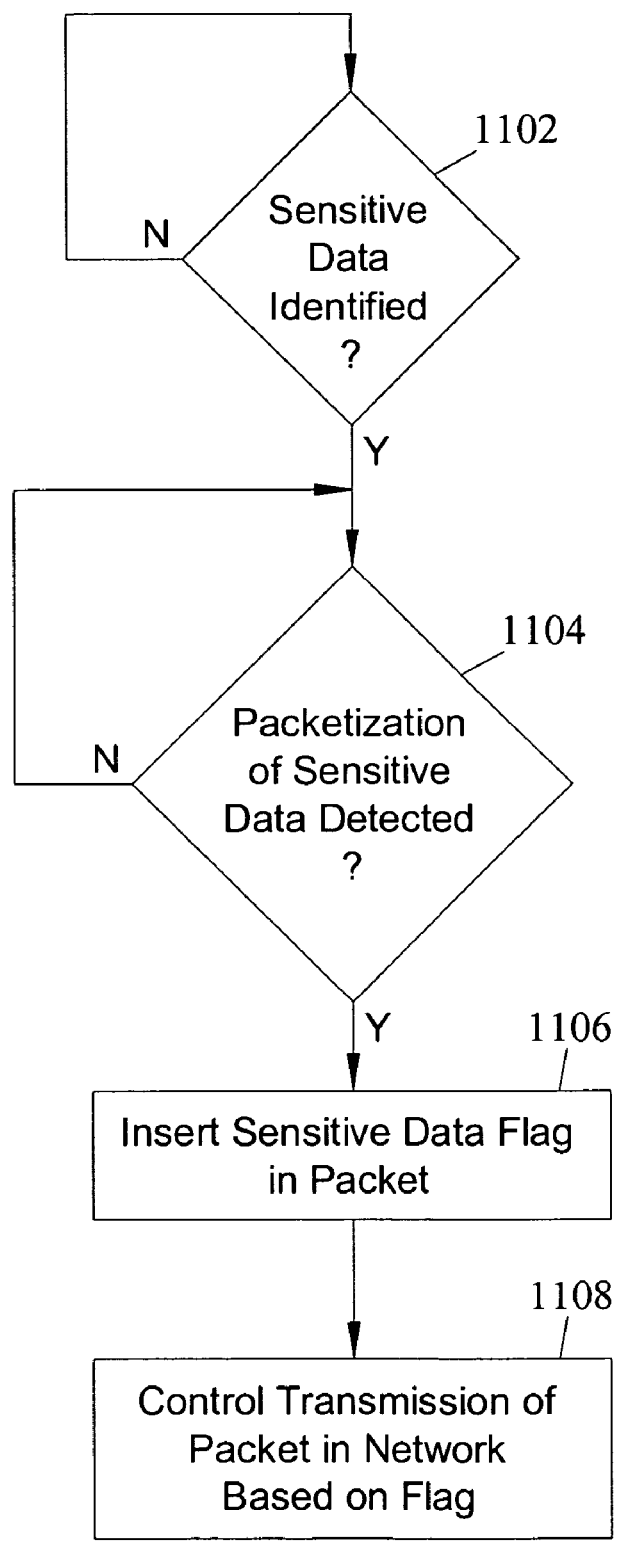
FIG. 11 is a flow chart of an exemplary sensitive data monitor/flagging process according to an embodiment of the subject matter described herein.

FIG. 11 shows an exemplary sensitive data monitor/flagging process 1100. At decision point 1102, sensitive data monitor/flagging process 1100 may wait for and may perform an action of identifying, in a system resource, sensitive data at an application layer. When sensitive data at an application layer has been identified in a system resource, sensitive data monitor/flagging process 1100 may transition to decision point 1104 where it may wait for and perform an action of detecting a packetization of the identified sensitive data. At block 1106, in response to identifying the sensitive data and detecting the packetization, sensitive data monitor/flagging process 1100 may perform an action of inserting a flag indicative of the presence of sensitive data in a packet having at least a portion of the identified sensitive data, wherein the flag is inserted in a portion of the packet corresponding to a layer other than the application layer. At block 1108, sensitive data monitor/flagging process 1100 may perform an action of controlling transmission of the packet in a network based on the flag.

A system for identifying sensitive application-layer data and controlling transmission of the data in a network may include means for identifying sensitive data in a system resource. For example, in FIG. 2, application monitor 206 may analyze user input, compare the user input to data in a sensitive data lexicon database 210, and determine whether the user input contains sensitive data.

The system may further include means for detecting a packetization of the identified sensitive data. For example, in FIG. 2, sensitive data agent 208 may detect when data is packetized for transmission and detect when a packet contains sensitive data. Detecting a packetization of sensitive data may also be done, in FIG. 3, by sensitive data network agent 304, where, upon receipt of a packet, sensitive data flags are identified indicating that the packet contains sensitive data.

The system may also include means for inserting a flag in a packet having at least a portion of the identified sensitive data, wherein inserting the flag in the packet includes inserting the flag in a portion of the packet corresponding to the means for detecting the packetization of the identified sensitive data as discussed above. For example, in FIG. 2, sensitive data agent 208 may, upon detection of a packetization of sensitive data, insert a flag from flag type database 212 into a portion of the packet corresponding to sensitive data transmission control. This portion of the packet may also correspond to and be associated with sensitive data network agent 304 of FIG. 3. As such, a protocol layer may be established between the two devices, sensitive data agent 208 of FIG. 2 and sensitive data network agent 304 of FIG. 3, to allow communication when sensitive data is packetized. As a further example, this portion of the packet corresponding to sensitive data transmission control may be any of the packet portions and fields described above in relation to FIGS. 6 through 10.

The system may also include means for controlling transmission of the sensitive data in a network by interpreting the flag during transmission of the packet. For example, in FIG. 3, sensitive data network agent 304 may, upon detection of flags in a portion of the packet corresponding to detection of the packetization of sensitive data, control transmission of any packet that contains any portion of sensitive data based upon rules and policies that are defined in rules/policy database 310.

There are many other possible actions that can be taken to allow tracking of system performance information, tracking of packet rule enforcement, and other types of system analysis. All are considered within the scope and spirit of the present disclosure. There are also many methods for provisioning devices within networks. Accordingly, any method that will allow provisioning of the network agents to provide a table or database of devices for forwarding policy/rule enforcement requests to should be considered to be within the scope and spirit of the present disclosure.

As networks become more and more complex, it may be desirable to distribute enforcement rules and policies amongst any of several network entities. Accordingly, any and all such distributions of policy and rule enforcement are also considered within the scope and spirit of the present disclosure.

It should be noted that the above described embodiments can also be used as a proxy device to allow deployment of this technology for use by legacy devices and applications. In this way, systems may be enhanced with the above-described disclosure without replacement of all components within a system.

With the framework described, some exemplary flags and their meanings can now be discussed. For example, in a situation where sensitive data should not leave a subnet, a Data Cannot Leave Subnet (DCLS) flag may be created. For a case where date transmission must be over an encrypted connection, a Data Cannot travel over an Unencrypted Connection (DCUC) flag may be created. As another example, when data should not be sent to a portable device (e.g., the MAC address would help identify this situation), a Data Cannot be sent to a Portable Device (DCPD) flag may be created. It should be noted that many other possible flag types may be envisioned based upon the present disclosure. All are considered within the scope and spirit of the present disclosure.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for identifying sensitive application-layer data and controlling transmission of the data in a network, the method comprising:
   identifying, in a system resource, sensitive data at an application layer;
   detecting a packetization of the identified sensitive data;
   in response to identifying the sensitive data and detecting the packetization, inserting, as part of the packetization, a flag indicative of the presence of sensitive data in a packet having at least a portion of the identified sensitive data, wherein the flag is inserted in a portion of the packet corresponding to one of a transport layer and a network layer; and
   controlling transmission of the packet in a network based on the flag.

2. The method of claim 1 wherein the system resource includes at least one of a file, data being input into email, data being input into a chat session, and stored information.

3. The method of claim 1 comprising creating a sensitive data definition at the application layer.

4. The method of claim 3 comprising storing the sensitive data definition in a database.

5. The method of claim 3 wherein identifying the sensitive data includes comparing data at the application layer with the sensitive data definition.

6. The method of claim 1 wherein controlling transmission of the packet in a network based on the flag includes processing a flag definition associated with the flag for use in controlling transmission of the packet in the network.

7. The method of claim 6 wherein the flag definition is retrieved from a database for processing.

8. The method of claim 1 wherein inserting the flag includes inserting the flag in a field of the packet.

9. The method of claim 8 wherein the field includes at least one of a type-of-service field of an Internet protocol (IP) header, an IP-options field of an IP header, a Transmission Control Protocol (TCP)-options field of a TCP header, an "option+padding" field of an IP version 4 (Ipv4) frame, an options field of a TCP frame, and a next-header field of an IP version 6 (Ipv6) datagram/frame.

10. The method of claim 1 wherein the flag includes at least one of a Data Cannot Leave Subnet (DCLS) flag, a Data Cannot travel over an Unencrypted Connection (DCUC) flag, and a Data Cannot be sent to a Portable Device (DCPD) flag.

11. The method of claim 1 wherein controlling transmission includes controlling egress of the packet at a network infrastructure device in the network.

12. The method of claim 11 wherein the network infrastructure device includes at least one of a network interface card (NIC), a gateway, a switch, a firewall, a router and a network bridge.

13. The method of claim 1 wherein controlling transmission includes controlling egress of the packet at a network interface of at least one of a host device, a local area network (LAN), a local area sub-network, a wide area network (WAN), and the Internet.

14. The method of claim 1 comprising creating a sensitive data flag definition and storing the sensitive data flag definition in a flag type database.

15. The method of claim 1, wherein the flag represents at least a distribution policy that limits distribution of packets associated with the flag, and wherein the packet will not be sent to a destination that would violate the at least one distribution policy represented by the flag.

16. A system for identifying sensitive application-layer data and controlling transmission of the data in a network, the system comprising software operating in connection with electronic hardware components including:
   an application monitor adapted to identify sensitive data at an application layer in a system resource;
   a sensitive data agent operatively associated with the application monitor adapted to detect a packetization of the sensitive data identified by the application monitor and to insert, as part of the packetization, a flag indicative of the presence of sensitive data in a packet having at least a portion of the identified sensitive data, wherein inserting the flag in the packet includes inserting the flag in a portion of the packet corresponding to one of a transport layer and a network layer; and
   a sensitive data network agent operatively associated with the sensitive data agent adapted to control transmission of the packet in a network by interpreting the flag during transmission of the packet;
   wherein at least one of the components are included in a network device configured for implementing the component.

17. The system of claim 16 wherein the system resource includes at least one of a file, data being input into email, data being input into a chat session, and stored information.

18. The system of claim 16 wherein the application monitor is adapted to create a sensitive data definition at the application layer.

19. The system of claim 18 wherein the sensitive data agent is adapted to store the sensitive data definition in a sensitive data database.

20. The system of claim 19 wherein the application monitor identifies the sensitive data by comparing data at the application layer with entries in the sensitive data database.

21. The system of claim 16 wherein the sensitive data agent is adapted to process a flag definition associated with the flag for use in controlling transmission of the packet in the network.

22. The system of claim 21 comprising a flag type database, wherein the sensitive data agent is adapted to retrieve the flag definition from the flag type database for processing.

23. The system of claim 16 wherein the sensitive data agent is adapted to insert the flag in a field of the packet.

24. The system of claim 23 wherein the field includes at least one of a type-of-service field of an Internet protocol (IP) header, an IP-options field of an IP header, a Transmission Control Protocol (TCP)-options field of a TCP header, an "option+padding" field of an IP version 4 (Ipv4) frame, an options field of a TCP frame, and a next-header field of an IP version 6 (Ipv6) datagram/frame.

25. The system of claim 16 wherein the flag includes at least one of a Data Cannot Leave Subnet (DCLS) flag, a Data Cannot travel over an Unencrypted Connection (DCUC) flag, and a Data Cannot be sent to a Portable Device (DCPD) flag.

26. The system of claim 16 wherein the sensitive data network agent is adapted to control egress of the packet at a network infrastructure device in the network.

27. The system of claim 26 wherein the network infrastructure device includes at least one of a network interface card (NIC), a gateway, a switch, a firewall, a router and a network bridge.

28. The system of claim 16 wherein the sensitive data network agent is adapted to control egress of the packet at a network interface of at least one of a host device, a local area network (LAN), a local area sub-network, a wide area network (WAN), and the Internet.

29. The system of claim 16, wherein the flag represents at least a distribution policy that limits distribution of packets associated with the flag, and wherein the packet will not be sent to a destination that would violate the at least one distribution policy represented by the flag.

30. A computer program product comprising computer-executable instructions embodied in a computer readable medium for performing steps comprising:
   identifying, in a system resource, sensitive data at an application layer;
   detecting a packetization of the identified sensitive data;
   in response to identifying the sensitive data and detecting the packetization, inserting, as part of the packetization, a flag indicative of the presence of sensitive data in a packet having at least a portion of the identified sensitive data, wherein the flag is inserted in a portion of the packet corresponding to one of a transport layer and a network layer; and
   controlling transmission of the packet in a network based on the flag.

31. The product of claim 30, wherein the flag represents at least a distribution policy that limits distribution of packets associated with the flag, and wherein the packet will not be sent to a destination that would violate the at least one distribution policy represented by the flag.

* * * * *

UNITED STATES PATENT AND TRADEMARK OFFICE
CERTIFICATE OF CORRECTION

Page 1 of 2

PATENT NO. : 8,301,771 B2
APPLICATION NO. : 11/259728
DATED : October 30, 2012
INVENTOR(S) : Singh et al.

It is certified that error appears in the above-identified patent and that said Letters Patent is hereby corrected as shown below:

On the Title Page, in the Figure, insert Main Designator -- 500 --, above the Figure.

In the Drawings:

In Fig. 1, Sheet 1 of 11, insert Main Designator -- 100 --, above the Figure.

In Fig. 2, Sheet 2 of 11, insert Main Designator -- 200 --, above the Figure.

In Fig. 3, Sheet 3 of 11, insert Main Designator -- 300 --, above the Figure.

In Fig. 3, Sheet 3 of 11, for Tag "306", in Line 1, delete "Enforcer" and insert -- Enforcer Entity --, therefor.

In Fig. 3, Sheet 3 of 11, for Tag "308", in Line 1, delete "Packet Analyzer" and insert -- Packet Analyzer Entity --, therefor.

In Fig. 4, Sheet 4 of 11, insert Main Designator -- 400 --, above the Figure.

In Fig. 5, Sheet 5 of 11, insert Main Designator -- 500 --, above the Figure.

In Fig. 6, Sheet 6 of 11, insert Main Designator -- 600 --, above the Figure.

In Fig. 7, Sheet 7 of 11, insert Main Designator -- 700 --, above the Figure.

In Fig. 8, Sheet 8 of 11, insert Main Designator -- 800 --, above the Figure.

In Fig. 9, Sheet 9 of 11, insert Main Designator -- 900 --, above the Figure.

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,301,771 B2

In Fig. 10, Sheet 10 of 11, insert Main Designator -- 1000 --, above the Figure.

In Fig. 11, Sheet 11 of 11, insert Main Designator -- 1100 --, above the Figure.

In the Specifications:

In Column 3, Line 67, delete "network 104." and insert -- network 106. --, therefor.

In Column 7, Line 24, delete "infrastructure database 104" and insert -- infrastructure device 104 --, therefor.

In Column 8, Line 14 & 15, delete "packet analyzer 308. Packet analyzer 308 can" and insert -- packet analyzer entity 308. Packet analyzer entity 308 can --, therefor.